(12) United States Patent
Yang et al.

(10) Patent No.: US 11,961,484 B2
(45) Date of Patent: Apr. 16, 2024

(54) CORRECTION METHOD, CORRECTION DEVICE AND CORRECTION SYSTEM FOR FREE FULL-SCREEN SPLICING

(71) Applicant: XI'AN NOVASTAR TECH CO., LTD., Shaanxi (CN)

(72) Inventors: Cheng Yang, Shaanxi (CN); Yonghong Ai, Shaanxi (CN); Yu Wang, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 16/963,260

(22) PCT Filed: Aug. 31, 2018

(86) PCT No.: PCT/CN2018/103553
§ 371 (c)(1),
(2) Date: Jul. 20, 2020

(87) PCT Pub. No.: WO2020/042153
PCT Pub. Date: Mar. 5, 2020

(65) Prior Publication Data
US 2021/0366411 A1    Nov. 25, 2021

(51) Int. Cl.
*G09G 3/32*    (2016.01)
*G02F 1/01*    (2006.01)
(Continued)

(52) U.S. Cl.
CPC .............. *G09G 3/342* (2013.01); *G09G 3/006* (2013.01); *G09G 5/003* (2013.01);
(Continued)

(58) Field of Classification Search
CPC ........ G09G 3/342; G09G 3/006; G09G 5/003; G09G 2320/0686; G09G 2320/10;
(Continued)

(56) References Cited

U.S. PATENT DOCUMENTS

| 6,292,157 B1 | 9/2001 | Greene et al. |
| 2008/0100805 A1 | 5/2008 | Majumder et al. |

(Continued)

FOREIGN PATENT DOCUMENTS

| CN | 1688160 A | * 10/2005 | ............... G02F 1/01 |
| CN | 103019643 A | 4/2013 | |

(Continued)

OTHER PUBLICATIONS

Tian, Zhihui et al. "Calibration of camera vignettingsurface on LED displayscreen". Chinese Journal of Luminescence. vol. 37, No. 8. Aug. 31, 2016 (Aug. 31, 2016). pp. 1008-1011.
(Continued)

*Primary Examiner* — Lin Li
(74) *Attorney, Agent, or Firm* — Samson G. Yu

(57) ABSTRACT

The application discloses a correction method, correction device and correction system for free full-screen splicing. According to the application, influence of reasons such as an external light source and a camera angle is eliminated based on curved surface simulation over color information data of multiple pixels, so that free full splicing may be implemented when a spliced display screen, after being used, is disassembled and transferred to another site for re-splicing.

12 Claims, 6 Drawing Sheets

(51) Int. Cl.
*G06F 3/147* (2006.01)
*G06F 16/73* (2019.01)
*G09G 3/00* (2006.01)
*G09G 3/34* (2006.01)
*G09G 5/00* (2006.01)
*H10K 77/10* (2023.01)

(52) U.S. Cl.
CPC ............... *G09G 2320/0626* (2013.01); *G09G 2320/0686* (2013.01); *G09G 2320/10* (2013.01); *G09G 2360/16* (2013.01)

(58) Field of Classification Search
CPC ....... G09G 2360/16; G02F 1/01; G06F 16/73; G06T 3/4038
See application file for complete search history.

(56) References Cited

U.S. PATENT DOCUMENTS

| | | | |
|---|---|---|---|
| 2009/0189924 A1 | 7/2009 | Ogura | |
| 2012/0069022 A1 | 3/2012 | Majumder et al. | |
| 2014/0193037 A1 | 7/2014 | Stitzinger et al. | |
| 2015/0091932 A1* | 4/2015 | Buckley | G06T 11/001 345/589 |
| 2015/0371405 A1 | 12/2015 | Zhao | |
| 2016/0363292 A1 | 12/2016 | Yang et al. | |
| 2018/0144716 A1 | 5/2018 | Jung et al. | |
| 2018/0267758 A1* | 9/2018 | Zhao | G09G 3/006 |
| 2019/0213941 A1* | 7/2019 | Beon | G09G 3/2003 |
| 2020/0066828 A1* | 2/2020 | Meersman | H10K 77/111 |
| 2020/0342819 A1* | 10/2020 | Cheng | G09G 3/342 |

FOREIGN PATENT DOCUMENTS

| | | | | |
|---|---|---|---|---|
| CN | 103559864 A | | 2/2014 | |
| CN | 104992669 A | * | 10/2015 | ............... G09G 3/32 |
| CN | 105047141 A | * | 11/2015 | ............... G09G 3/34 |
| CN | 105185315 A | * | 12/2015 | ............... G09G 3/32 |
| CN | 106448576 A | * | 2/2017 | ............... G09G 3/34 |
| CN | 107025881 A | | 8/2017 | |
| CN | 104616247 B | * | 11/2017 | ........... G06T 3/4038 |
| CN | 108074517 A | | 5/2018 | |
| CN | 108196810 A | * | 6/2018 | ............. G06F 3/147 |
| CN | 109271552 A | * | 1/2019 | ............. G06F 16/73 |
| KR | 20180068639 A | | 6/2018 | |
| WO | 2018084516 A1 | | 5/2018 | |

OTHER PUBLICATIONS

Search report of corresponding EP application No. 18931613.6.
Search report of corresponding CN application No. 201880083292.6 dated Feb. 9, 2022.

* cited by examiner

CORRECTION METHOD, CORRECTION DEVICE AND CORRECTION SYSTEM FOR FREE FULL-SCREEN SPLICING

TECHNICAL FIELD

The application relates to the technical field of display correction, and particularly to a correction method for free full-screen splicing, a correction device for free full-screen splicing and a correction system for free full-screen splicing.

BACKGROUND

A collected brightness image of a Light-Emitting Diode (LED) display screen includes brightness of LED lamps, and external light also influences collection of the brightness image. In addition, the brightness of the LED lamps in the collected image may not front brightness of LED lamp points, and due to a luminescence characteristic of the LED lamp that brightness at different angles is different, collected lateral brightness of the LED lamp is relatively low. However, this condition is inevitable because a brightness collection camera is very small relative to a large. LED screen and lateral brightness of many lamps is inevitably collected. As a result, a brightness image in collected images presents a uniform transition form, called a curved surface form.

For an LED display screen with the abovementioned characteristic, a screen body is built in a plant and, after being processed in an existing correction manner, is disassembled and transferred to a temporary site, and splicing out of sequence may cause brightness differences visible to naked eyes between boxes, namely brightness in the boxes is uniform but brightness transitions between the boxes are inconsistent. At present, the following three processing methods are mainly adopted for point-by-point correction of such an LED screen body that is temporarily spliced and built for application.

First: correction numbers of boxes are recorded, and the screen body is sequentially built strictly according to the correction numbers on each temporary site. In practice, a large display screen includes hundreds and even thousands of boxes, so that this method is time-consuming, labor-consuming and non-universal.

Second: after an LED display screen is built on each temporary site, full-screen correction is performed. By this method, brightness uniformity of the screen body on each temporary site may be ensured. However, frequent correction is troublesome, hard for users to accept and particularly unacceptable for event organizers and stage builders in the live event field that such spliced display screens are widely applied to.

Third: a high-accuracy brightness and chromaticity measurement instrument such as Minolta CS100A and CS2000 is utilized. Each leased box is corrected and processed by box-by-box calibration with a brightness and chromaticity meter in a plant. This method is a mainstream method at present, but the brightness and chromaticity measurement instrument is expensive. Cost pressure is quite high and unbearable for general users, particularly organizers undertaking medium/small-scale live events.

Therefore, a leased screen body makes a higher requirement on a technology for point-by-point correction of an LED display screen.

SUMMARY

According to a first aspect of the application, a correction method for free full-screen splicing is disclosed, which may include the following steps: (a) a collected image during displaying of a target picture on a spliced display screen is acquired; (b) image information processing is performed on the collected image to acquire multiple pieces of pixel color information data of the spliced display screen; (c) curved surface simulation is performed based on the multiple pieces of pixel color information data to obtain a pixel color information distribution curved surface; (d) multiple pieces of real pixel color information data are obtained based on the multiple pieces of pixel color information data and the pixel color information distribution curved surface; (e) correction target color information data is set, and color information correction coefficients of multiple pixels of the spliced display screen are obtained by taking the multiple pieces of real pixel color information data as initial color information data; and (f) the color information correction coefficients of the multiple pixels are uploaded to the spliced display screen.

In the conventional art, directly acquired pixel color information data is taken as initial color information data. In fact, due to a display characteristic of the display screen, there is a relatively great deviation between the directly acquired pixel color information data and real pixel color information data. Consequently, each portion of the display screen may not be accurately corrected according to a correction coefficient obtained based on the directly acquired pixel color information data, and boxes are required to be spliced according to a fixed sequence. In embodiments of the application, the real pixel color information data is obtained based on the pixel color information distribution curve surface, the correction coefficient is obtained based on the real pixel color information data, and each portion of the display screen may be accurately corrected according to the correction coefficient, so that the problem of inconsistent curved surface transition when the spliced display screen is disassembled and freely re-spliced after being corrected may be solved, and free full-screen splicing may be implemented.

In a possible implementation mode of the first aspect of the application, the step that curved surface simulation is performed based on the multiple pieces of pixel color information data to obtain the pixel color information distribution curved surface may include that: the multiple pieces of pixel color information data are preprocessed to obtain multiple pieces of preprocessed pixel color information data, and curved surface simulation is performed based on the multiple pieces of preprocessed pixel color information data to obtain the pixel color information distribution curved surface; and the step that the multiple pieces of real pixel color information data are obtained based on the multiple pieces of pixel color information data and the pixel color information distribution curved surface may include that: the multiple pieces of real pixel color information data are obtained based on the multiple pieces of preprocessed pixel color information data and the pixel color information distribution curved surface.

In the embodiments of the application, the acquired pixel color information data is preprocessed at first, then the pixel color information distribution curved surface is obtained based on the preprocessed pixel color information data to obtain the real pixel color information data, the correction coefficient is obtained based on the real pixel color information data, and each portion of the display screen may be corrected accurately according to the correction coefficient, so that the problem of inconsistent curved surface transition when the spliced display screen is disassembled and freely re-spliced after being corrected may be solved, and free full-screen splicing may be implemented.

In a possible implementation mode of the first aspect of the application, the multiple pieces of pixel color information data may be multiple pieces of brightness data or multiple pieces of brightness and chromaticity data.

In a possible implementation mode of the first aspect of the application, the step that the multiple pieces of pixel color information data are preprocessed to obtain the multiple pieces of preprocessed pixel color information data may include that: at least one exceptional point of the spliced display screen is determined, and influence of the at least one exceptional point is eliminated; and/or a position of a bright/dark block of the spliced display screen is determined, and brightness of the bright/dark block is regulated.

In the embodiments of the application, the acquired pixel color information data is preprocessed at first to eliminate the influence of the at least one exceptional point and/or bright/dark block of the display screen, then the pixel color information distribution curved surface is obtained based on the preprocessed pixel color information data to obtain the real pixel color information data, the correction coefficient is obtained based on the real pixel color information data, and each portion of the display screen may be corrected accurately according to the correction coefficient, so that the problem of inconsistent curved surface transition when the spliced display screen is disassembled and freely re-spliced after being corrected may be solved, and free full-screen splicing may be implemented.

In a possible implementation mode of the first aspect of the application, the step that the exceptional point of the spliced display screen is determined and the influence of the at least one exceptional point is eliminated may include that: the multiple pieces of pixel color information data are sequenced according to a magnitude sequence, a pixel corresponding to the pixel color information data greater than a first threshold value is determined as an exceptional bright point, and a median of the multiple pieces of pixel color information data is set as the pixel color information data of the exceptional bright point; and/or a pixel corresponding to the pixel color information data less than a second threshold value is determined as an exceptional dark point, and the pixel color information data of the exceptional dark point is set to be 0 to eliminate influence of the exceptional dark point.

In the embodiments of the application, the acquired pixel color information data is sequenced according to magnitudes to determine the exceptional bright point and the median of the acquired pixel color information data is set as the pixel color information data of the exceptional bright point, and/or the exceptional dark point is determined and the pixel color information data of the exceptional dark point is set to be 0. In such a manner, the influence of the exceptional bright point and/or exceptional dark point of a screen body is eliminated. Then, the pixel color information distribution curved surface is obtained based on the pixel color information data from which the influence of the at least one exceptional point is eliminated to obtain the real pixel color information data, the correction coefficient is obtained based on the real pixel color information data, and each portion of the display screen may be corrected accurately according to the correction coefficient, so that the problem of inconsistent curved surface transition when the spliced display screen is disassembled and freely re-spliced after being corrected may be solved, and free full-screen splicing may be implemented.

In a possible implementation mode of the first aspect of the application, the first threshold value may be a first multiple of the pixel color information data at a first percentage; and/or the second threshold value may be a second multiple of the pixel color information data at a second percentage.

In a possible implementation mode of the first aspect of the application, the first percentage may be greater than the second percentage, the first multiple may be greater than 1, and the second multiple may be less than 0.5.

In a possible implementation mode of the first aspect of the application, the bright/dark block may be a bright/dark region in a display region of the spliced display screen, and the bright/dark region may be a rectangular region or a region formed by combining multiple rectangles.

In a possible implementation mode of the first aspect of the application, the step that the position of the bright/dark block of the spliced display screen is determined may include that: a region mean comparison method is used.

In a possible implementation mode of the first aspect of the application, the step that the brightness of the bright/dark block is regulated may include that: pixel color information data of pixels of n columns or m rows adjacent to the bright/dark block is accumulated, and a first mean is calculated; pixel color information data of pixels of n columns or m rows at positions adjacent to the pixels of the n columns or the m rows in the bright/dark block is accumulated, and a second mean is calculated; a regulation coefficient is obtained based on a ratio of the first mean to the second mean; and pixel color information data of each pixel in the bright/dark block is regulated based on the regulation coefficient.

In the embodiments of the application, the position of the bright/dark block in the acquired pixel color information data is determined, and then the regulation coefficient is calculated according to the pixel color information data of a region adjacent to the bright/dark block, thereby regulating the pixel color information data of the bright/dark block of the screen body. In such a manner, the influence of the bright/dark block of the screen body is eliminated. Then, the pixel color information distribution curved surface is obtained based on the pixel color information data from which the influence of the bright/dark block is eliminated to obtain the real pixel color information data, the correction coefficient is obtained based on the real pixel color information data, and each portion of the display screen may be corrected accurately according to the correction coefficient, so that the problem of inconsistent curved surface transition when the spliced display screen is disassembled and freely re-spliced after being corrected may be solved, and free full-screen splicing may be implemented.

In a possible implementation mode of the first aspect of the application, the step that curved surface simulation is performed based on the multiple pieces of preprocessed pixel color information data to obtain the pixel color information distribution curved surface may include that: curved surface simulation is performed by use of a smoothing method or a fitting method to obtain the pixel color information distribution curved surface; and the step that the multiple pieces of real pixel color information data are obtained based on the multiple pieces of preprocessed pixel color information data and the pixel color information distribution curved surface may include that: the multiple pieces of preprocessed pixel color information data are divided by data of corresponding positions in the pixel color information distribution curved surface respectively to obtain the multiple pieces of real pixel color information data.

According to a second aspect of the application, a correction device for free full-screen splicing is disclosed, which may include a memory and one or more processors connected with the memory, wherein the memory may store a program code, and the program code may be executed by the one or more processors to implement the following steps: (i) a collected image during displaying of a target picture on a spliced display screen is acquired; (ii) image information processing is performed on the collected image to acquire multiple pieces of pixel color information data of the spliced display screen; (iii) curved surface simulation is performed based on the multiple pieces of pixel color information data to obtain a pixel color information distribution curved surface; (iv) multiple pieces of real pixel color information data are obtained based on the multiple pieces of pixel color information data and the pixel color information distribution curved surface; (v) correction target color information data is set, and color information correction coefficients of multiple pixels of the spliced display screen are obtained by taking the multiple pieces of real pixel color information data as initial color information data; and (vi) the color information correction coefficients of the multiple pixels are uploaded to the spliced display screen.

Optionally, in the second aspect of the application, the processor may execute any possible method in the first aspect.

According to a third aspect of the application, a correction device for free full-screen splicing is disclosed, which may include: an image acquisition component, configured to acquire a collected image during displaying of a target picture on a spliced display screen; an image processing component, configured to perform image information processing on the collected image to acquire multiple pieces of pixel color information data of the spliced display screen; a curved surface simulation component, performing curved surface simulation based on the multiple pieces of pixel color information data to obtain a pixel color information distribution curved surface; a data calculation component, obtaining multiple pieces of real pixel color information data based on the multiple pieces of pixel color information data and the pixel color information distribution curved surface; a correction coefficient calculation component, configured to set correction target color information data and obtain color information correction coefficients of multiple pixels of the spliced display screen by taking the multiple pieces of real pixel color information data as initial color information data; and an uploading component, uploading the color information correction coefficients of the multiple pixels to the spliced display screen.

In a possible implementation mode of the third aspect of the application, the curved surface simulation component may include: a preprocessing unit, configured to preprocess the multiple pieces of pixel color information data to obtain multiple pieces of preprocessed pixel color information data, and a simulation unit, configured to perform curved surface simulation based on the multiple pieces of preprocessed pixel color information data to obtain the pixel color information distribution curved surface; and the data calculation component may include: a calculation unit, obtaining the multiple pieces of real pixel color information data based on the multiple pieces of preprocessed pixel color information data and the pixel color information distribution curved surface.

According to a fourth aspect of the application, a correction system for free full-screen splicing is disclosed, which may include: a spliced display screen; an image collection device, configured to collect a target picture displayed on the spliced display screen to obtain a collected image; and a correction device, configured to implement any abovementioned method.

According to a fifth aspect of the application, a computer program product is disclosed, which may be configured to execute any abovementioned method in a processor.

According to a sixth aspect of the application, a computer-readable medium is disclosed, which may store a program code, the program code including an instruction configured to execute any abovementioned method.

According to a seventh aspect of the application, a correction device for free full-screen splicing is disclosed, which has functions in the abovementioned method design. These functions may be realized through hardware and may also be realized through corresponding software executed by the hardware. The hardware or the software includes one or more units corresponding to the functions.

BRIEF DESCRIPTION OF THE DRAWINGS

The drawings described here are adopted to provide a further understanding to the application and form a part of the application. Schematic embodiments of the application and descriptions thereof are adopted to explain the application and not intended to form improper limits to the application. In the drawings.

DETAILED DESCRIPTION OF THE EMBODIMENTS

It is to be noted that the embodiments in the application and characteristics in the embodiments may be combined without conflicts. The application will be described below with reference to the drawings and in combination with the embodiments.

In order to make those of ordinary skill in the art understand the technical solutions of the application better, the technical solutions in the embodiments of the application will be clearly and completely described below in combination with the drawings in the embodiments of the application. It is apparent that the described embodiments are not all embodiments but only a part of the embodiments of the application. All other embodiments obtained by those of ordinary skill in the art based on the embodiments in the application without creative work shall fall within the scope of protection of the application.

It is to be noted that terms "first", "second" and the like in the specification, claims and drawings of the application are adopted not to describe a specific sequence or order but to distinguish similar objects. It is to be understood that terms used like this may be exchanged under a proper condition for implementation of the embodiments of the application described here in sequences besides those shown or described herein. In addition, terms "include" and "have" and any transformation thereof are intended to cover non-exclusive inclusions. For example, a process, method, system, product or device including a series of steps or units is not limited to those clearly listed steps or units, but may include other steps or units which are not clearly listed or inherent in the process, the method, the system, the product or the device.

It is further to be noted that, in the invention, term "and/or" is only an association relationship describing associated objects and represents that three relationships may exist. For example, A and/or B may represent three conditions: i.e., independent existence of A, existence of both A and B and independent existence of B. In addition, character "/" in the invention usually represents that previous and next associated objects form an "or" relationship.

It is further to be noted that division of multiple embodiments of the application is for convenient description and not intended to form particular limits and the characteristics in each embodiment may be combined and used as mutual references without conflicts.

Embodiment 1

Figure 1:
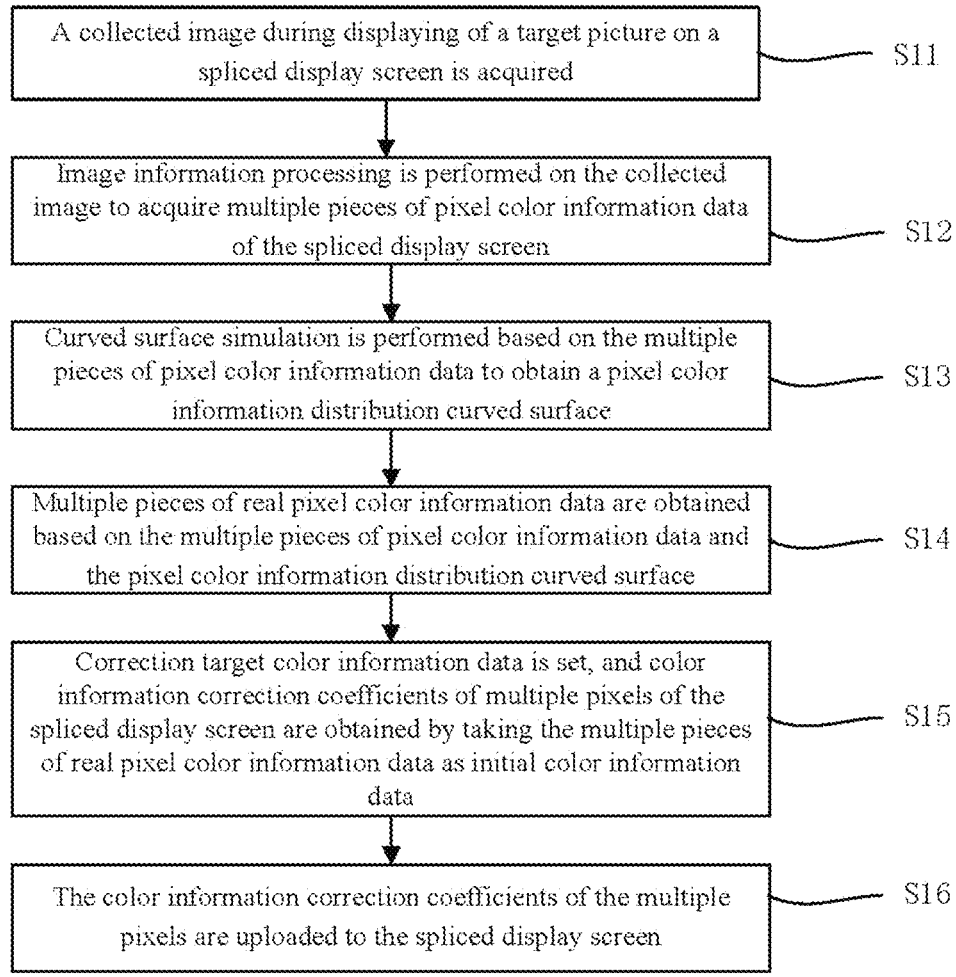
FIG. 1 is a flowchart of a correction method for free full-screen splicing according to embodiment 1 of the application.

Specifically, embodiment 1 of the application discloses a correction method for free full-screen splicing. As shown in FIG. 1, through the correction method for free full-screen splicing in embodiment 1 of the application, on a correction site, after a spliced display screen is spliced, data collection and correction are performed, after the spliced display screen is used, boxes are disassembled (namely the spliced display screen is disassembled into multiple splicing units such as LED boxes) and transferred to another site, and the spliced display screen, when being rebuilt, is not required to be sequentially built and may be built according to any sequence.

The correction method for free full-screen splicing in embodiment 1 of the application includes, for example, the following steps.

In S11, a collected image during displaying of a target picture on a spliced display screen is acquired.

In S12, image information processing is performed on the collected image to acquire multiple pieces of pixel color information data of the spliced display screen.

In S13, curved surface simulation is performed based on the multiple pieces of pixel color information data to obtain a pixel color information distribution curved surface.

In S14, multiple pieces of real pixel color information data are obtained based on the multiple pieces of pixel color information data and the pixel color information distribution curved surface.

In S15, correction target color information data is set, and color information correction coefficients of multiple pixels of the spliced display screen are obtained by taking the multiple pieces of real pixel color information data as initial color information data.

In S16, the color information correction coefficients of the multiple pixels are uploaded to the spliced display screen.

More specifically, for example, the spliced display screen is an LED display screen. For calculating correction coefficients of red, green and blue LED lamps in each display pixel, it is necessary to collect monochromatic images such as a red screen image, a green screen image and a blue screen image of the spliced display screen respectively. The target picture mentioned in S11 refers to anyone of a red picture, green picture and blue picture displayed on the spliced display screen.

The operation in S12 that image information processing is performed on the collected image includes, for example, that: the collected image is processed to determine a distribution region of pixels in the collected image; and then positioning calculation is performed on each monochromatic image to determine a position of each pixel in the collected image, each piece of pixel color information data of each monochromatic image is statistically obtained point by point, and the pixel color information data of each monochromatic image is normalized, thereby obtaining the multiple pieces of pixel color information data.

Herein, the pixel color information data may be brightness data or brightness and chromaticity data. For convenient introduction of the embodiment, introductions are made below with the condition that the pixel color information data is the brightness data as an example. It is to be understood that the correction method for free full-screen splicing in the embodiment is also applied to the condition that the pixel color information data is the brightness data.

Figure 2:
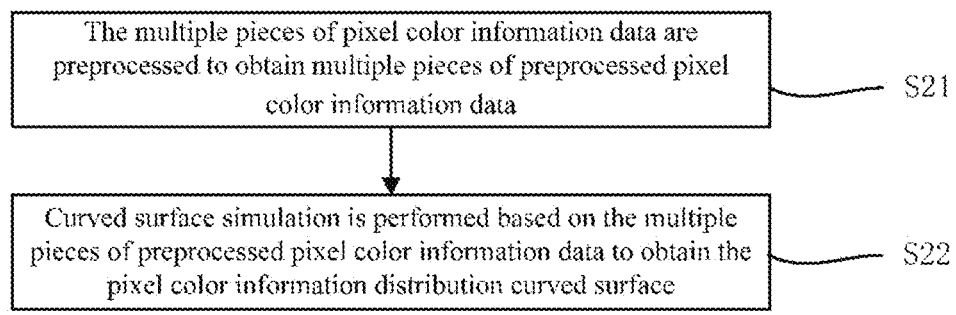
FIG. 2 is a flowchart of obtaining a pixel color information distribution curved surface in a correction method for free full-screen splicing according to embodiment 1 of the application.

As shown in FIG. 2, the operation in S13 that curved surface simulation is performed based on the multiple pieces of pixel color information data to obtain the pixel color information distribution curved surface may include, but not limited to, the following S21 and S22.

In S21, the multiple pieces of pixel color information data are preprocessed to obtain multiple pieces of preprocessed pixel color information data.

In S22, curved surface simulation is performed based on the multiple pieces of preprocessed pixel color information data to obtain the pixel color information distribution curved surface.

Figure 3:
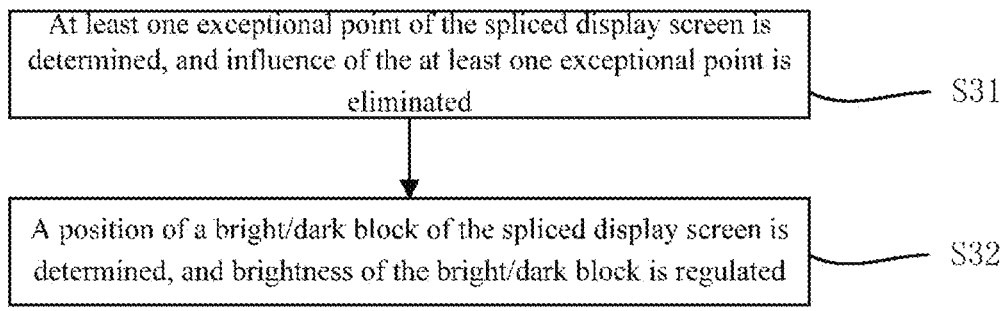
FIG. 3 is a flowchart of preprocessing in a correction method for free full-screen splicing according to embodiment 1 of the application.

As shown in FIG. 3, the operation in S21 that the multiple pieces of brightness data (pixel color information data) are preprocessed may include, but not limited to, the following S31 and/or S32.

In S31, at least one exceptional point of the spliced display screen is determined, and influence of the at least one exceptional point is eliminated. The step may specifically be as follows: the obtained multiple pieces of pixel color information data are sequenced according to a magnitude sequence, a first multiple of the pixel color information data at a first percentage is determined as a first threshold value, a pixel corresponding to the pixel color information data greater than the first threshold value is determined as an exceptional bright point, and a median of the obtained multiple pieces of pixel color information data is set as (replaces) the pixel color information data of the exceptional bright point; and/or a second multiple of the pixel color information data at a second percentage is determined as a second threshold value, a pixel corresponding to the pixel color information data less than the second threshold value is determined as an exceptional dark point, and the pixel color information data of the exceptional dark point is set to be 0 to eliminate influence of the exceptional dark point. The first percentage is greater than the second percentage, the first multiple is greater than 1, and the second multiple is less than 0.5.

For example, S31, i.e., the step that the exceptional point of the spliced display screen is determined and the influence of the at least one exceptional point is eliminated, includes that: the acquired multiple pieces of brightness data are sequenced from small to large magnitudes, 1.2 times of a brightness value of 95% brightness is determined as the first threshold value, the pixel greater than the first threshold value is determined as the exceptional bright point, the exceptional bright point being usually a controllable point, and a brightness value of the point is set to be (replaced with) the median of the acquired multiple pieces of brightness data; and/or 0.15 times of a brightness value of 90% brightness is determined as the second threshold value, the pixel corresponding to brightness data less than the second threshold value is determined as the exceptional dark point, the exceptional dark point being an uncontrollable point, and the pixel gives a minor response no matter how it is regulated. Therefore, brightness of the exceptional dark point is set to be 0 and is not involved in calculation anymore.

In S32, a position of a bright/dark block of the spliced display screen is determined, and brightness of the bright/dark block is regulated. Specifically, due to the problems of different production batches, different service time and the like of part of splicing units such as LED boxes of the display screen, bright and dark blocks may appear on the display screen. It is to be noted that the bright/dark block mentioned here is not limited to take LED box as a unit and may be a bright/dark region with any size and the bright/dark region is, for example, a rectangular region or a region with T-shaped and L-shaped horizontal and vertical edges formed by superimposing multiple rectangles. Under a normal condition, the position of the bright/dark block may be directly determined for positioning by naked eyes, or the position of the bright/dark block is obtained by use of a region mean comparison method.

The operation that the position of the bright/dark block is obtained by use of the region mean comparison method is implemented through, for example, the following steps: a small rectangular frame is created at first, for example, a width includes 7 pixels and a height includes 7 pixels; pixels of the whole collected image are traversed, difference values of a mean of the pixels in a left upper rectangular frame, a mean in a right upper rectangular frame, a mean in a left lower rectangular frame and a mean in a right lower rectangular frame are calculated to obtain a local mean difference matrix, namely the local mean difference matrix is an accumulation of an absolute value of a difference obtained by subtracting the mean in the right upper rectangular frame from the mean in the left upper rectangular frame, an absolute value obtained by subtracting the mean in the right lower rectangular frame from the mean in the left lower rectangular frame, an absolute value obtained by subtracting the mean in the left lower rectangular frame from the mean in the left upper rectangular frame and an absolute value obtained by subtracting the mean in the right lower rectangular frame from the mean in the right upper rectangular frame; a binary boundary position matrix is created, the value of each pixel in the difference matrix is traversed, and if the value of a pixel in a neighborhood range is maximum, a coordinate value of the pixel is recorded and input into a boundary matrix; and edge points of the bright/dark block are stored in the obtained boundary matrix, and these edge points are repaired to form a closed rectangle, i.e., the position of the bright/dark block (i.e., a position of the bright block or a position of the dark block). One embodiment of regulating the brightness of the bright/dark block may be as follows: pixel color information data of pixels of n columns or m rows adjacent to the bright/dark block is accumulated, and a first mean is calculated; pixel color information data of pixels of n columns or m rows at positions adjacent to the pixels of the n columns or the m rows in the bright/dark block is accumulated, and a second mean is calculated; a regulation coefficient is obtained based on a ratio of the first mean to the second mean; and pixel color information data of each pixel in the bright/dark block is regulated based on the regulation coefficient.

Figure 4A:
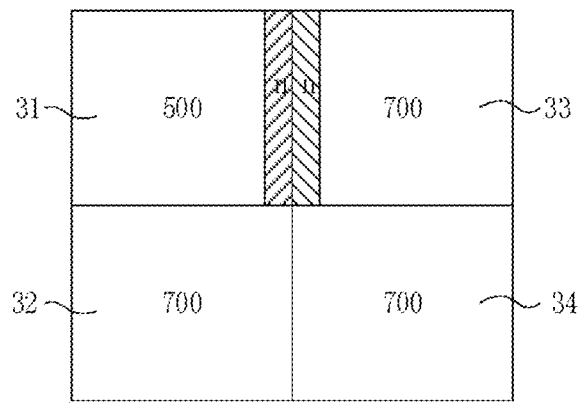
FIG. 4a is a schematic diagram of extracting pixels of n columns at a dark block and adjacent positions in a correction method for free full-screen splicing according to embodiment 1 of the application.
Figure 4B:
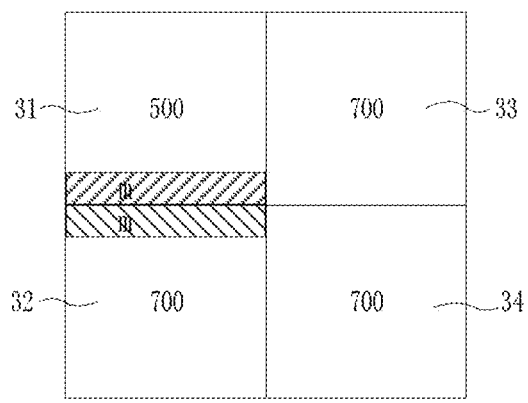
FIG. 4b is a schematic diagram of extracting pixels of m rows at a dark block and adjacent positions in a correction method for free full-screen splicing according to embodiment 1 of the application.

The step that the first mean and the second mean are calculated to obtain the regulation coefficient to regulate the brightness of each pixel in the bright/dark block will be described in combination with FIG. 4a and FIG. 4b in detail. As shown in FIG. 4a and FIG. 4b, the spliced display screen is formed by, for example, splicing four LED boxes, the number of pixels in each LED box being k*k. Through S12, the brightness of each pixel in the collected image may be obtained, and then overall mean brightness of each LED box may be calculated. For example, mean brightness of a box 31 is 500 and mean brightness of boxes 32 to 34 is, for example, 700. The box 31 is connected with the box 32 and the box 33, and compared with the box 32 and the box 33, the box 31 is a dark block. At first, brightness data of n columns is extracted at adjacent positions of the box 33 and the box 31 respectively, as shown in FIG. 4a; and brightness data of m rows is extracted at adjacent positions of the box 32 and the box 31, as shown in FIG. 4b.

A calculation formula for total brightness of pixels of the n columns in the box 33 is:

$$P_{sum_1} = \sum_{i_1=1}^{k} P_{i_1} + \sum_{i_2=1}^{k} P_{i_2} + ... + \sum_{i_n=1}^{k} P_{i_n},$$

where $P_{sum_1}$ is the total brightness of the pixels of the n columns selected in the box 33, $$\sum_{i_1=1}^{k} P_{i_1}$$

is total brightness of the pixels of the first column in the n columns selected in the box 33, and by parity of reasoning, $$\sum_{i_n=1}^{k} P_{i_n}$$

is the total brightness of the pixels of the nth column in the n columns selected in the box 33.

A calculation formula for mean brightness of the pixels of the n columns in the box 33 is:

$P_1 = P_{sum1}/(k*n)$.

Similarly, mean brightness $P_3$ of pixels of the n columns selected in the box 31 may be obtained.

A calculation formula for total brightness of pixels of the m rows in the box 32 is:

$$P_{sum_2} = \sum_{j_1=1}^{k} P_{j_1} + \sum_{j_2=1}^{k} P_{j_2} + \ldots + \sum_{j_m=1}^{k} P_{j_m},$$

where $P_{sum2}$ is the total brightness of the pixels of the m rows selected in the box 32, $$\sum_{j_1=1}^{k} P_{j_1}$$

is total brightness of the pixels of the first row in the m rows selected in the box 32, and by parity of reasoning, $$\sum_{j_m=1}^{k} P_{j_m}$$

is the total brightness of the pixels of the mth row in the m rows selected in the box 32.

A calculation formula for mean brightness of the pixels of the m rows in the box 32 is:

$P_2 = P_{sum2}/(k*m)$.

Similarly, mean brightness $P_4$ of pixels of the m rows selected in the box 31 may be obtained.

A calculation method for the regulation coefficient k is:

$k = ((P_1+P_2)/((P_3+P_4)/2)$.

After the regulation coefficient k is obtained, the pixel color information data of each pixel in the dark block 31 is regulated based on the regulation coefficient. Of course, for the bright block of the spliced display screen, calculation steps are the same as the abovementioned steps and thus will not be elaborated. It is to be noted herein that the steps for implementing regulation of the bright/dark block are described with the simplest condition that a bright/dark block independently exists as an example but the embodiment of the invention is not limited thereto. For the condition that multiple components with different brightness are adjacent and different in size, m and n are adaptively regulated, and meanwhile, calculation of k may also correspondingly change. For example:

$k = P_1/P_3$ or $k = P_2/P_4$.

Specifically, through data preprocessing of S31 and/or S32, the influence of the uncontrollable point may be eliminated, and the brightness of the bright/dark point is regulated to make subsequent application of curved surface simulation based on the smoothing method and the like more effective and reduce errors, so that a generated brightness coefficient is more accurate for correction of the spliced display screen, and the corrected spliced display screen may have a free full-screen splicing effect.

Then, when an image collection device such as an area-array camera shoots the spliced display screen, a curved surface formed for reasons such as an external light source and a camera angle is smooth but high in degree of freedom, and such a brightness curved surface and pixel brightness information are combined to form brightness data obtained by image information processing over the collected image, namely the brightness data obtained by image information processing over the collected image is actually a superimposition of real brightness data of each pixel and data of the brightness curved surface formed for reasons such as the external light source and the camera angle. There is made such a reasonable hypothesis that a luminous intensity of each pixel under the same Pulse Width Modulation (PWM) is consistent with a Gaussian distribution. In such case, data collected by the camera is still consistent with a curved surface form but is also locally discrete. The brightness curved surface is simulated in a smoothing or fitting manner, etc. and may be considered to be approximate to a brightness curved surface form formed by shooting. Then, influence of the curved surface is eliminated from the image data to obtain a piece of discrete real pixel brightness data, and the data is consistent with the Gaussian distribution.

Figure 5:
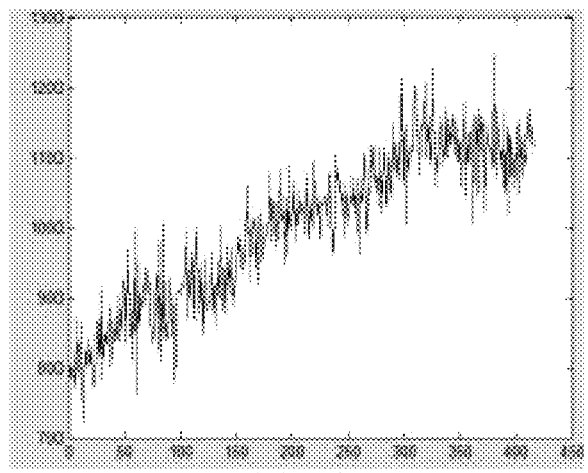
FIG. 5 shows pixel color information data obtained by performing image information processing on a collected image in a correction method for free full-screen splicing according to embodiment 1 of the application.

FIG. 5 shows brightness data obtained by performing image information processing on pixels of a row in the collected image. The ordinate represents a brightness value of the pixel, and the abscissa represents a position of the pixel subjected to image information processing. The brightness values of each adjacent pixel are connected with straight lines to obtain the broken line graph shown in FIG. 5. Then, curved surface simulation is performed in the smoothing or fitting manner to obtain a simulated curved surface. It is to be known that the spliced display screen consists of pixels of multiple rows and multiple columns. Curved surface simulation is performed on the brightness data of the pixels of the row in FIG. 5 to obtain a brightness curve shown in FIG. 6. The brightness curved surface may be formed only by performing curved surface simulation based on data of the pixels of the multiple rows.

Curved surface simulation in S13 is implemented by, for example, the smoothing or fitting method. A median filtering method in smoothing methods and a least square method in fitting methods will be introduced below in detail.

A main principle of the median filtering method is as follows: a region, usually a square region, taking a certain pixel as a center point is determined at first; then gray values of each pixel in the region are sequenced, and a median therein is determined as a new gray value of the pixel taken as the center point, the region being usually called a window herein; and after the window is moved upwards, downwards, leftwards and rightwards in the image, smoothing processing may be performed on the image by use of a median filtering algorithm.

A one-dimensional sequence $f_1, f_2, \ldots, f_n$ is set, the point number of a window is m (m is an odd number), and median filtering is performed, namely m numbers $f_{i-v}, \ldots f_{i-1}, f_i, f_{i+1}, \ldots, f_{i+v}$ are sequentially extracted from the input sequence ($f_i$ is a value of a center point of the window and v=(m−1)/2), then the m points are sequenced according to numerical magnitudes thereof, and the number of which the serial number is the center point is determined as a filtering output. A mathematical formula is represented as follows:

$$y_i = Med\{f_{i-v}, \ldots, f_i, \ldots, f_{i+v}\}^{i \in N, v = \frac{m-1}{2}}.$$

Similarly, two-dimensional median filtering may be represented as the following formula:

$$y_{ij} = \underset{A}{Med}\{f_{ij}\},$$

where A is the window and $\{f_{ij}\}$ is a two-dimensional data sequence.

A main principle of the least square method in fitting is as follows: it is set that $f_{(x)}$ is an original function, $\Phi_{(x)}$ is an approximate function and $(x_i, f_{(x_i)})$ (i=1, ..., n) is a data point, and $\Phi_{(x)}$ is required to be selected to make $$\sum_{i=1}^{n}[f(x_i) - \Phi(x_i)]^2$$

minimum.

When $\Phi_{(x)}$ is selected to be a polynomial, fitting is called polynomial fitting.

In a secondary fitting function, it is known that the data point is $(x_i, y_i)$, i=1, 2, ..., n; and
the secondary function $p_{(x)} = a_0 + a_1 x + a_2 x^2$ is used as an approximate fitting curve, and a mean square error is $$Q(a_0, a_1, a_2) = \sum_{i=1}^{n}(a_0 + a_1 x + a_2 x^2 - y_i)^2$$

and minimum.

Figure 6:
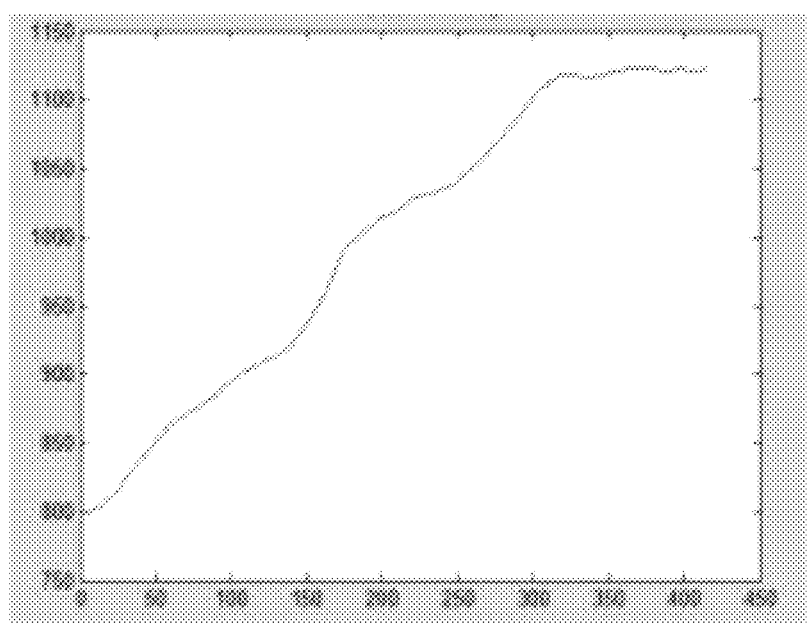
FIG. 6 is a pixel color information distribution curve obtained by curved surface simulation in a correction method for free full-screen splicing according to embodiment 1 of the application.

The brightness curve may be simulated by the median filtering method or the least square method, as shown in FIG. 6.

Figure 7:
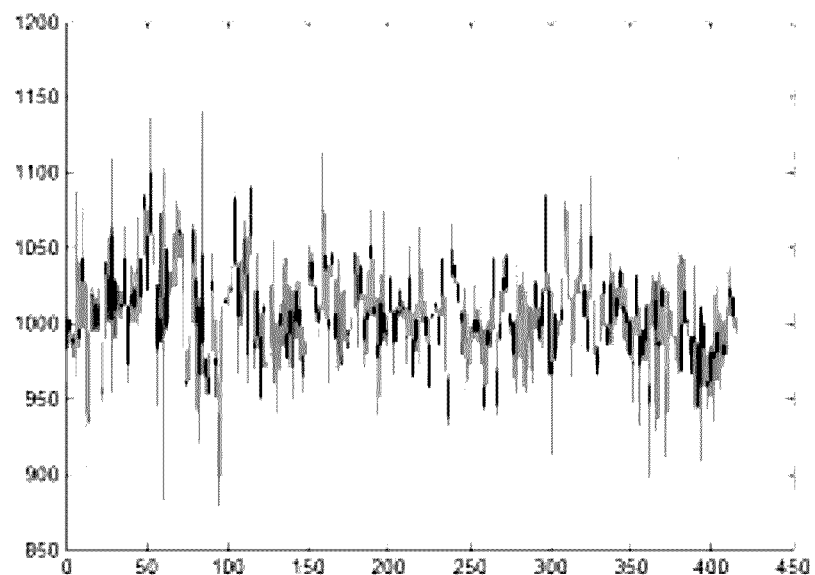
FIG. 7 shows multiple pieces of real pixel color information data obtained in a correction method for free full-screen splicing according to embodiment 1 of the application.

The operation in S14 that the multiple pieces of real pixel color information data are obtained based on the multiple pieces of pixel color information data and the pixel color information distribution curved surface includes that the multiple pieces of real pixel color information data are obtained based on the multiple pieces of preprocessed pixel color information data and the pixel color information distribution curved surface. Specifically, the step includes, for example, that: the multiple pieces of preprocessed pixel color information data are divided by data of corresponding positions in the pixel color information distribution curved surface respectively to obtain the multiple pieces of real pixel color information data. Specifically, the obtained brightness data shown in FIG. 5 may be divided by the data of the brightness distribution curve obtained by curved surface simulation in FIG. 6 to obtain real brightness data shown in FIG. 7.

Next, in S15, the correction target brightness data is set, and the correction target brightness data may be divided by the real brightness data determined as initial brightness data to obtain the correction coefficient. The correction coefficient is a matrix with the same size as a resolution of the LED display screen. A method for calculating the correction coefficient in S15 is, for example, as follows:

[conversion_coefficient]=[XYZ_target]*[XYZ_original]−1, where $$XYZ\_target = \begin{matrix} RX\_targ & RY\_targ & RZ\_targ \\ GX\_targ & GY\_targ & GZ\_targ \\ BX\_targ & BY\_targ & BZ\_targ \end{matrix}$$

is a correction target brightness data matrix;

$$XYZ\_original = \begin{matrix} RX\_orig & RY\_orig & RZ\_orig \\ GX\_orig & GY\_orig & GZ\_orig \\ BX\_orig & BY\_orig & BZ\_orig \end{matrix}$$

is an initial brightness data matrix; and $$conversion\_coefficient = \begin{matrix} RR & RG & RB \\ GR & GG & GB \\ BR & BG & BB \end{matrix}$$

is a correction coefficient matrix, where
RR is a brightness coefficient of the red LED lamp when a display source signal is red;
RG is a brightness coefficient of the green LED lamp when the display source signal is red;
RB is a brightness coefficient of the blue LED lamp when the display source signal is red;
GR is the brightness coefficient of the red LED lamp when the display source signal is green;
GG is the brightness coefficient of the green LED lamp when the display source signal is green;
GB is the brightness coefficient of the blue LED lamp when the display source signal is green;
BR is the brightness coefficient of the red LED lamp when the display source signal is blue;
BG is the brightness coefficient of the green LED lamp when the display source signal is blue; and
BB is the brightness coefficient of the blue LED lamp when the display source signal is blue.

In S16, the obtained correction coefficients are uploaded to the spliced display screen, and then correction of the spliced display screen is completed.

From the above, according to the correction method for free full-screen splicing in the embodiment, influence of the reasons such as the external light source and the camera angle is eliminated, so that free full splicing may be implemented when the display screen is disassembled and transferred to another site for rebuilding after the spliced display screen is used, the problem of inconsistent curved surface transition when the spliced display screen is disassembled and freely re-spliced after being corrected may be solved, the operation of recording and looking for box numbers on the leasing site may be avoided, the trouble that the spliced display screen is required to be corrected on each leasing site may be avoided, multiple batches of spliced display screens with bright/dark blocks may be corrected to implement free splicing, manpower and material resources are greatly saved, lessors are not required to purchase brightness and chromaticity measurement instruments, and the cost is reduced.

Embodiment 2

Figure 8:
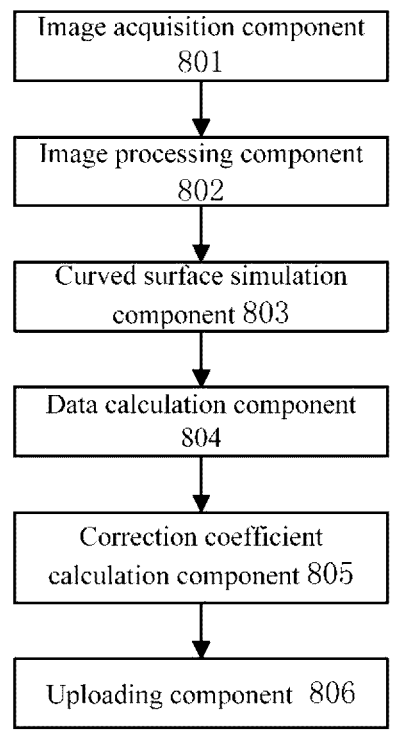
FIG. 8 is a structure diagram of a correction device for free full-screen splicing according to embodiment 2 of the application.

Embodiment 2 of the application provides a correction device for free full-screen splicing, as shown in FIG. 8. The correction device for free full-screen splicing includes an image acquisition component 801, an image processing component 802, a curved surface simulation component 803, a data calculation component 804, a correction coefficient calculation component 805 and an uploading component 806.

Specifically, the image acquisition component 801 is configured to acquire a collected image during displaying of a target picture on a spliced display screen. The image processing component 802 is configured to perform image information processing on the collected image to acquire multiple pieces of pixel color information data of the spliced display screen. The curved surface simulation component 804 performs curved surface simulation based on the multiple pieces of pixel color information data to obtain a pixel color information distribution curved surface. The data calculation component 804 obtains multiple pieces of real pixel color information data based on the multiple pieces of pixel color information data and the pixel color information distribution curved surface. The correction coefficient calculation component 805 is configured to set correction target color information data and obtain color information correction coefficients of multiple pixels of the spliced display screen by taking the multiple pieces of real pixel color information data as initial color information data. The uploading component 806 uploads the color information correction coefficients of the multiple pixels to the spliced display screen.

Figure 9:
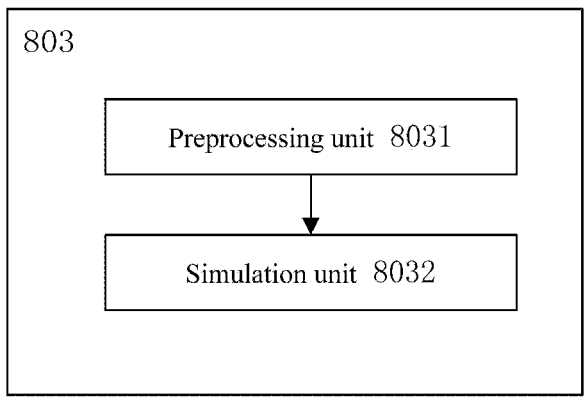
FIG. 9 is a structure diagram of a curved surface simulation component in a correction device for free full-screen splicing according to embodiment 2 of the application.
Figure 10:
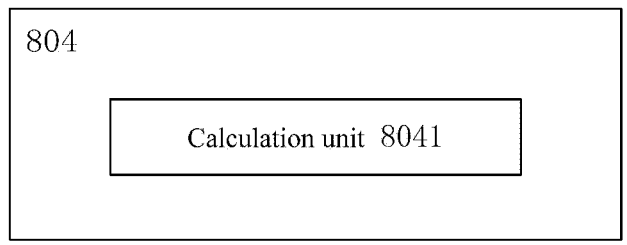
FIG. 10 is a structure diagram of a data calculation component in a correction device for free full-screen splicing according to embodiment 2 of the application.

As shown in FIG. 9, the curved surface simulation component 803 includes a preprocessing unit 8031 and a simulation unit 8032. The preprocessing unit 8031 is configured to preprocess the multiple pieces of pixel color information data to obtain multiple pieces of preprocessed pixel color information data. The simulation unit 8032 is configured to perform curved surface simulation based on the multiple pieces of preprocessed pixel color information data to obtain the pixel color information distribution curved surface. As shown in FIG. 10, the data calculation component 804 includes a calculation unit 8041. The calculation unit 8041 obtains the multiple pieces of real pixel color information data based on the multiple pieces of preprocessed pixel color information data and the pixel color information distribution curved surface.

Figure 11:
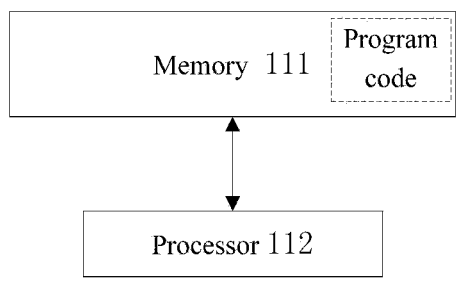
FIG. 11 is another structure diagram of a correction device for free full-screen splicing according to embodiment 2 of the application.

In addition, the embodiment provides another correction device for free full-screen splicing. As shown in FIG. 11, the correction device includes a memory 111 and one or more processors 112 connected with the memory 111. A program code is stored in the memory 111, and the program code may be executed by the one or more processors 112 to implement the following steps.

In (i), a collected image during displaying of a target picture on a spliced display screen is acquired.

In (ii), image information processing is performed on the collected image to acquire multiple pieces of pixel color information data of the spliced display screen.

In (iii), curved surface simulation is performed based on the multiple pieces of pixel color information data to obtain a pixel color information distribution curved surface.

In (iv), multiple pieces of real pixel color information data are obtained based on the multiple pieces of pixel color information data and the pixel color information distribution curved surface.

In (v), correction target color information values are set, and color information correction coefficients of multiple pixels of the spliced display screen are obtained by taking the multiple pieces of real pixel color information data as initial color information values.

In (vi), the color information correction coefficients of the multiple pixels of the spliced display screen are uploaded to the spliced display screen.

A correction method implemented by the correction device for free full-screen splicing in the embodiment is as mentioned in embodiment 1 and thus will not be described in detail herein.

Optionally, each component and unit, the processor, the memory and the other abovementioned operations or functions in embodiment 2 are adopted to implement the method in embodiment 1 respectively, and for simplicity, elaborations are omitted herein.

From the above, according to the correction device for free full-screen splicing in embodiment 2 of the application, multiple batches of spliced display screens with bright/dark blocks may be corrected, so that free full-screen splicing may be implemented, the problem of inconsistent curved surface transition when the spliced display screen is disassembled and freely re-spliced after being corrected may be solved, the tedious work of recording and looking for box numbers on a leasing site may be avoided, time consumption and labor consumption caused by the fact that the display screen is required to be corrected on each leasing site may be avoided, lessors are not required to purchase brightness and chromaticity measurement instruments, and the cost is reduced.

Embodiment 3

Figure 12:
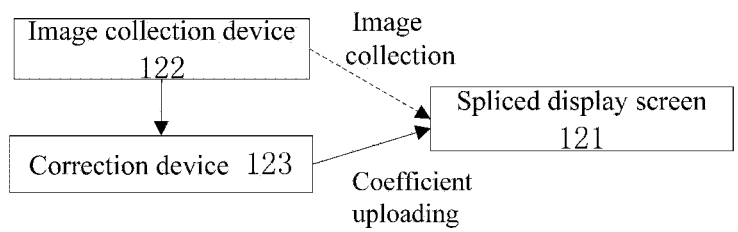
FIG. 12 is a structure diagram of a correction system for free full-screen splicing according to embodiment 3 of the application.

Embodiment 3 of the application provides a correction system for free full-screen splicing, which, as shown in FIG. 12, includes:

a spliced display screen 121;

an image collection device 122, configured to collect a target picture displayed on the spliced display screen to obtain a collected image; and a correction device 123, configured to implement the steps of the correction method in embodiment 1. Specifically, the device may be configured to acquire the collected image, perform image information processing on the collected image to acquire multiple pieces of pixel color information data, perform curved surface simulation based on the multiple pieces of pixel color information data to obtain a pixel color information distribution curved surface, obtain multiple pieces of real pixel color information data based on the multiple pieces of pixel color information data and the pixel color information distribution curved surface, set correction target color information data, obtain color information correction coefficients of multiple pixels of the spliced display screen by taking the multiple pieces of real pixel color information data as initial color information data and upload the color information correction coefficients of the multiple pixels to the spliced display screen.

Figure 13:
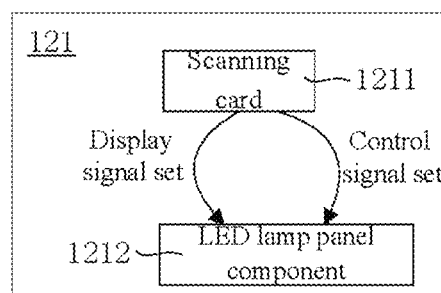
FIG. 13 is a structure diagram of a spliced display screen in a correction system for free full-screen splicing according to embodiment 3 of the application.

The spliced display screen 121 may be an LED screen formed by splicing multiple boxes, and is configured to receive the color information correction coefficients of the multiple pixels from the correction device 123 and perform brightness correction or brightness and chromaticity correction on an input image based on the color information correction coefficients of the multiple pixels to implement picture displaying. As shown in FIG. 13, the spliced display screen 121 includes a scanning card 1211 and an LED lamp panel component 1212. The scanning card 1211 is configured to perform brightness or brightness and chromaticity correction on input image data according to the color information correction coefficients of the multiple pixels from the correction device 123 and transmit a control signal set and a display signal set to the LED lamp panel component 1212 to display a corrected image. It is to be noted herein that a single LED box is usually provided with at least one scanning card 1211 and an LED lamp panel component 1212 connected with the at least one scanning card 1211 and consisting of one or more LED lamp panels.

Moreover, the image collection device 122 is configured to collect the target picture displayed on the spliced display screen to obtain the collected image. The image collection device may optionally be a device such as a Charge Coupled Device (CCD)/Complementary Metal Oxide Semiconductor (CMOS) digital camera and a CCD/CMOS industrial camera. Herein, a type of the image collection device is not limited, and any device capable of forming an image may be used in the system. Preferably, in the embodiment or another embodiment, a full-frame high-resolution CCD digital camera is adopted. This is because it is convenient to use, large in photosensitive area and relatively high in photosensitivity, a Bayer color filter manufacturing process is relatively simple and the digital camera has been produced for civil use and is lower in cost. A measurement mechanism of the digital camera adopts a CCD photosensitive element-based measurement manner. Compound light is emitted by an area light source and enters a lens of the digital camera, the compound light may be decomposed into monochromatic light of three channels Red, Green and Blue (RGB) through a Bayer color filter arranged at a front end, the monochromatic light of the three channels RGB are dispersed to an area-array CCD photosensitive element, and relative RGB value outputs are calculated through a back-end microprocessor. For calculating correction coefficients of red, green and blue LED lamps in each display pixel, it is necessary to collect a red screen image, green screen image and blue screen image of the LED screen respectively, and then these images are transmitted to the correction device 123.

Then, the correction device 123 acquires the collected image from the image collection device 122 to implement the correction method in embodiment 1. Specifically, introductions to the correction method adopted by the correction device may refer to embodiment 1, introductions to the correction device may refer to embodiment 2 and the correction device and the correction method are not repeatedly introduced in embodiment 3. The correction device 123 may be a Personal Computer (PC), a server, a handheld device or portable device, a tablet device, a multiprocessor system, a microprocessor-based system, an editable consumer electronic device, a network PC, a minicomputer, a large computer and a distributed calculation environment including any abovementioned system or device.

From the above, according to the correction system for free full-screen splicing in embodiment 3 of the application, influence of reasons such as an external light source and a camera angle may be eliminated, so that, after the spliced display screen is corrected through the correction system, free full splicing may be implemented when the display screen, after being used, is disassembled and transferred to another site for re-splicing, the problem of inconsistent curved surface transition when the spliced display screen is disassembled and freely re-spliced after being corrected may be solved, the operation of recording and looking for box numbers on the leasing site or the trouble that full-screen correction is required to be performed on each leasing site may be avoided, multiple batches of spliced display screens with bright/dark blocks may be corrected, free splicing may be implemented, manpower and material resources are greatly saved, lessors are not required to purchase brightness and chromaticity measurement instruments, and the cost is reduced.

It can be seen from the above descriptions about the implementation modes that those skilled in the art may clearly know that the application may be implemented in a manner of combining software and a necessary universal hardware platform. Based on such an understanding, the technical solutions of the application substantially or parts making contributions to the conventional art may be embodied in form of software product. The computer software product is stored in a storage medium, for example, a Read-Only Memory (ROM)/Random Access Memory (RAM), an optical disk and a magnetic disk, including a plurality of instructions configured to enable a computer device (which may be a PC, a server, a network device or the like) to the method in each embodiment of the application or some parts of the embodiment.

It is apparent that those skilled in the art should know that each component or each method step of the application may be implemented through a universal computing device. They may be concentrated in a single computing device or distributed in a network formed by multiple computing devices. Optionally, they may be implemented by program codes executable for the computing devices and thus may be stored in a storage device for execution with the computing devices. Or, they may form various integrated circuit components respectively, or multiple components or steps therein may form a single integrated circuit component for implementation. Therefore, the application is not limited to any specific hardware and software combination.

The above is only the preferred embodiment of the application and not intended to limit the application. For those skilled in the art, the application may have various modifications and variations. Any modifications, equivalent replacements, improvements and the like made within the spirit and principle of the application shall fall within the scope of the application.

What is claimed is:

1. A correction method for free full-screen splicing, comprising:
   acquiring a collected image during displaying of a target picture on a spliced display screen, wherein the collected image is collected by an image collection device;
   performing image information processing on the collected image to acquire multiple pieces of pixel color information data of the spliced display screen, wherein the multiple pieces of pixel color information data are multiple pieces of brightness data or multiple pieces of chromaticity data, the multiple pieces of pixel color information data are still consistent with a curved surface form but are also locally discrete;
   performing curved surface simulation based on the multiple pieces of pixel color information data to obtain a pixel color information distribution curved surface;

obtaining multiple pieces of real pixel color information data based on the multiple pieces of pixel color information data and the pixel color information distribution curved surface;

setting correction target color information data, and obtaining color information correction coefficients of multiple pixels of the spliced display screen by taking the multiple pieces of real pixel color information data as initial color information data; and uploading the color information correction coefficients of the multiple pixels to the spliced display screen;

the step of performing curved surface simulation based on the multiple pieces of pixel color information data to obtain the pixel color information distribution curved surface comprises: preprocessing the multiple pieces of pixel color information data to obtain multiple pieces of preprocessed pixel color information data, and performing curved surface simulation based on the multiple pieces of preprocessed pixel color information data to obtain the pixel color information distribution curved surface;

wherein the step of preprocessing the multiple pieces of pixel color information data to obtain the multiple pieces of preprocessed pixel color information data comprises: determining at least one exceptional point of the spliced display screen, and eliminating influence of the at least one exceptional point; and/or determining a position of a bright/dark block of the spliced display screen, and regulating brightness of the bright/dark block;

wherein the step of determining the exceptional point of the spliced display screen and eliminating the influence of the at least one exceptional point comprises: sequencing the multiple pieces of pixel color information data according to an order of size, determining a pixel corresponding to the pixel color information data greater than a first threshold value as an exceptional bright point, and setting a median of the multiple pieces of pixel color information data as the pixel color information data of the exceptional bright point; the exceptional bright point is a controllable point, the exceptional dark point is an uncontrollable point;

the step of performing curved surface simulation based on the multiple pieces of preprocessed pixel color information data to obtain the pixel color information distribution curved surface comprises: performing curved surface simulation by use of a smoothing method or a fitting method to obtain the pixel color information distribution curved surface; and the step of obtaining the multiple pieces of real pixel color information data based on the multiple pieces of preprocessed pixel color information data and the pixel color information distribution curved surface comprises: dividing the multiple pieces of preprocessed pixel color information data by data of corresponding positions in the pixel color information distribution curved surface respectively to obtain the multiple pieces of real pixel color information data, wherein influence of the pixel color information distribution curved surface is eliminated from the image data to obtain a piece of discrete real pixel brightness data.

2. The correction method for free full-screen splicing as claimed in claim 1, wherein the step of obtaining the multiple pieces of real pixel color information data based on the multiple pieces of pixel color information data and the pixel color information distribution curved surface comprises: obtaining the multiple pieces of real pixel color information data based on the multiple pieces of preprocessed pixel color information data and the pixel color information distribution curved surface.

3. The correction method for free full-screen splicing as claimed in claim 1, wherein the step of determining the exceptional point of the spliced display screen and eliminating the influence of the at least one exceptional point comprises:

determining a pixel corresponding to the pixel color information data less than a second threshold value as an exceptional dark point, and setting the pixel color information data of the exceptional dark point to be 0 to eliminate influence of the exceptional dark point.

4. The correction method for free full-screen splicing as claimed in claim 3, wherein the first threshold value is a first multiple of the pixel color information data at a first percentage; and/or the second threshold value is a second multiple of the pixel color information data at a second percentage.

5. The correction method for free full-screen splicing as claimed in claim 4, wherein the first percentage is greater than the second percentage, the first multiple is greater than 1, and the second multiple is less than 0.5.

6. The correction method for free full-screen splicing as claimed in claim 1, wherein the step of regulating the brightness of the bright/dark block comprises:

accumulating pixel color information data of pixels of n columns or m rows adjacent to the bright/dark block, and calculating a first mean of the pixel color information data of pixels of n columns or m rows adjacent to the bright/dark block;

accumulating pixel color information data of pixels of n columns or m rows at positions adjacent to the pixels of the n columns or the m rows in the bright/dark block, and calculating a second mean of the pixel color information data of pixels of n columns or m rows at positions adjacent to the pixels of the n columns or the m rows in the bright/dark block;

obtaining a regulation coefficient based on a ratio of the first mean to the second mean; and regulating pixel color information data of each pixel in the bright/dark block based on the regulation coefficient.

7. The correction method for free full-screen splicing as claimed in claim 1, wherein the step of performing image information processing on the collected image to acquire multiple pieces of pixel color information data of the spliced display screen comprises:

processing the collected image to determine a distribution region of pixels in the collected image;

performing positioning calculation on each monochromatic image to determine a position of each pixel in the collected image;

obtaining, statistically point by point, each piece of pixel color information data of each monochromatic image; and normalizing the pixel color information data of each monochromatic image to obtain the multiple pieces of pixel color information data.

8. The correction method for free full-screen splicing as claimed in claim 1, the correction coefficient is a matrix with the same size as a resolution of the LED display screen.

9. The correction method for free full-screen splicing as claimed in claim 1, wherein the correction target brightness data may be divided by the real brightness data determined as initial brightness data to obtain the correction coefficient.

10. A correction device for free full-screen splicing, comprising a memory and one or more processors connected with the memory, wherein the memory stores a program code, and the program code is executed by the one or more processors to:
acquire a collected image during displaying of a target picture on a spliced display screen;
perform image information processing on the collected image to acquire multiple pieces of pixel color information data of the spliced display screen, wherein the multiple pieces of pixel color information data are multiple pieces of brightness data or multiple pieces of chromaticity data, the multiple pieces of pixel color information data are still consistent with a curved surface form but are also locally discrete;
perform curved surface simulation based on the multiple pieces of pixel color information data to obtain a pixel color information distribution curved surface;
obtain multiple pieces of real pixel color information data based on the multiple pieces of pixel color information data and the pixel color information distribution curved surface;
set correction target color information data and obtaining color information correction coefficients of multiple pixels of the spliced display screen by taking the multiple pieces of real pixel color information data as initial color information data;
upload the color information correction coefficients of the multiple pixels to the spliced display screen;
the processor is further configured to preprocess the multiple pieces of pixel color information data to obtain multiple pieces of preprocessed pixel color information data, and perform curved surface simulation based on the multiple pieces of preprocessed pixel color information data to obtain the pixel color information distribution curved surface;
the processor is further configured to determine at least one exceptional point of the spliced display screen, and eliminating influence of the at least one exceptional point; and/or determining a position of a bright/dark block of the spliced display screen, and regulating brightness of the bright/dark block, wherein the exceptional bright point is a controllable point, the exceptional dark point is an uncontrollable point;
the processor is further configured to perform curved surface simulation by use of a smoothing method or a fitting method to obtain the pixel color information distribution curved surface; and
the processor is further configured to divide the multiple pieces of preprocessed pixel color information data by data of corresponding positions in the pixel color information distribution curved surface respectively to obtain the multiple pieces of real pixel color information data, wherein influence of the pixel color information distribution curved surface is eliminated from the image data to obtain a piece of discrete real pixel brightness data.

11. The correction device for free full-screen splicing as claimed in claim 10, wherein the processor is further configured to obtain the multiple pieces of real pixel color information data based on the multiple pieces of preprocessed pixel color information data and the pixel color information distribution curved surface.

12. A correction system for free full-screen splicing, comprising:
a spliced display screen;
an image collection device, configured to collect a target picture displayed on the spliced display screen to obtain a collected image, the multiple pieces of pixel color information data are still consistent with a curved surface form but are also locally discrete; and
a correction device comprises a memory and one or more processors connected with the memory, wherein the memory stores a program code, and the program code is executed by the one or more processors to:
acquire the collected image during displaying of a target picture on a spliced display screen;
perform image information processing on the collected image to acquire multiple pieces of pixel color information data of the spliced display screen;
perform curved surface simulation based on the multiple pieces of pixel color information data to obtain a pixel color information distribution curved surface, the multiple pieces of pixel color information data are still consistent with a curved surface form but are also locally discrete;
obtain multiple pieces of real pixel color information data based on the multiple pieces of pixel color information data and the pixel color information distribution curved surface;
set correction target color information data, and obtaining color information correction coefficients of multiple pixels of the spliced display screen by taking the multiple pieces of real pixel color information data as initial color information data; and
upload the color information correction coefficients of the multiple pixels to the spliced display screen;
the program code is executed by the one or more processors to: preprocess the multiple pieces of pixel color information data to obtain multiple pieces of preprocessed pixel color information data, and perform curved surface simulation based on the multiple pieces of preprocessed pixel color information data to obtain the pixel color information distribution curved surface;
the program code is executed by the one or more processors to: determine at least one exceptional point of the spliced display screen, and eliminating influence of the at least one exceptional point; and/or determine a position of a bright/dark block of the spliced display screen, and regulating brightness of the bright/dark block;
the program code is executed by the one or more processors to: sequence the multiple pieces of pixel color information data according to an order of size, determine a pixel corresponding to the pixel color information data greater than a first threshold value as an exceptional bright point, and set a median of the multiple pieces of pixel color information data as the pixel color information data of the exceptional bright point, the exceptional bright point is a controllable point, the exceptional dark point is an uncontrollable point;
the program code is executed by the one or more processors to: perform curved surface simulation by use of a smoothing method or a fitting method to obtain the pixel color information distribution curved surface; and
the program code is executed by the one or more processors to: divide the multiple pieces of preprocessed pixel color information data by data of corresponding positions in the pixel color information distribution curved surface respectively to obtain the multiple pieces of real pixel color information data, wherein influence of the pixel color information distribution curved surface is eliminated from the image data to obtain a piece of discrete real pixel brightness data.

* * * * *